(12) United States Patent
Moriguchi et al.

(10) Patent No.: US 6,498,320 B2
(45) Date of Patent: Dec. 24, 2002

(54) POWER SUPPLY APPARATUS FOR ARC-UTILIZING APPARATUS

(75) Inventors: Haruo Moriguchi, Itami (JP); Tetsuro Ikeda, Osaka (JP); Hideo Ishii, Minoo (JP)

(73) Assignee: Sansha Electric Manufacturing Company, Limite, Osaka (JP)

( * ) Notice: Subject to any disclaimer, the term of this patent is extended or adjusted under 35 U.S.C. 154(b) by 0 days.

(21) Appl. No.: 09/999,023

(22) Filed: Nov. 15, 2001

(65) Prior Publication Data
US 2002/0056708 A1 May 16, 2002

(30) Foreign Application Priority Data
Nov. 15, 2000 (JP) .................................. 2000-348464

(51) Int. Cl.[7] ................................. B23K 9/10
(52) U.S. Cl. ................. 219/130.21; 363/142
(58) Field of Search ............. 219/130.21, 130.1, 219/130.31, 130.32, 130.33, 137 PS; 363/142, 143

(56) References Cited

U.S. PATENT DOCUMENTS

| | | | | |
|---|---|---|---|---|
| 5,310,992 A | * | 5/1994 | Karino et al. | 219/130.21 |
| 5,930,122 A | * | 7/1999 | Moriguchi et al. | 363/17 |
| 6,023,416 A | | 2/2000 | Shikata et al. | |
| 6,054,674 A | | 4/2000 | Moriguchi et al. | |
| 6,069,811 A | * | 5/2000 | Moriguchi et al. | 363/142 |
| 6,269,015 B1 | * | 7/2001 | Ikeda et al. | 219/130.21 |

FOREIGN PATENT DOCUMENTS

JP    HEI 11-77302    3/1999

* cited by examiner

Primary Examiner—Clifford C Shaw
(74) Attorney, Agent, or Firm—Duane Morris LLP

(57) ABSTRACT

One of commercial AC voltages is coupled to power supply terminals from one of commercial AC power supplies. The AC power supplies belong to either a first group providing higher voltages or a second group providing lower voltages. A rectifier rectifies the AC voltage applied to the power supply terminals, and a rectified voltage is developed between two rectifier output terminals. A switching unit operates to connect voltage-boosting converters selectively in series and in parallel between the rectifier output terminals. Inverters are connected in the output sides of and in association with the respective voltage-boosting converters for converting DC voltages from the associated voltage-boosting converters to high-frequency voltages. The high-frequency voltages are voltage-transformed by associated voltage-transformers, and the voltage-transformed high-frequency voltages are converted into a DC voltage by a rectifier circuit and a reactor. The DC voltage is developed between output terminals of the apparatus. A switching control unit controls the switching unit so as to connect the voltage-boosting converters in series between the rectifier output terminals when a commercial AC power supply of the first group is connected to the power supply terminals, while connecting the voltage-boosting converters in parallel between the rectifier output terminals when a commercial AC power supply of the second group is connected to the power supply terminals.

3 Claims, 3 Drawing Sheets

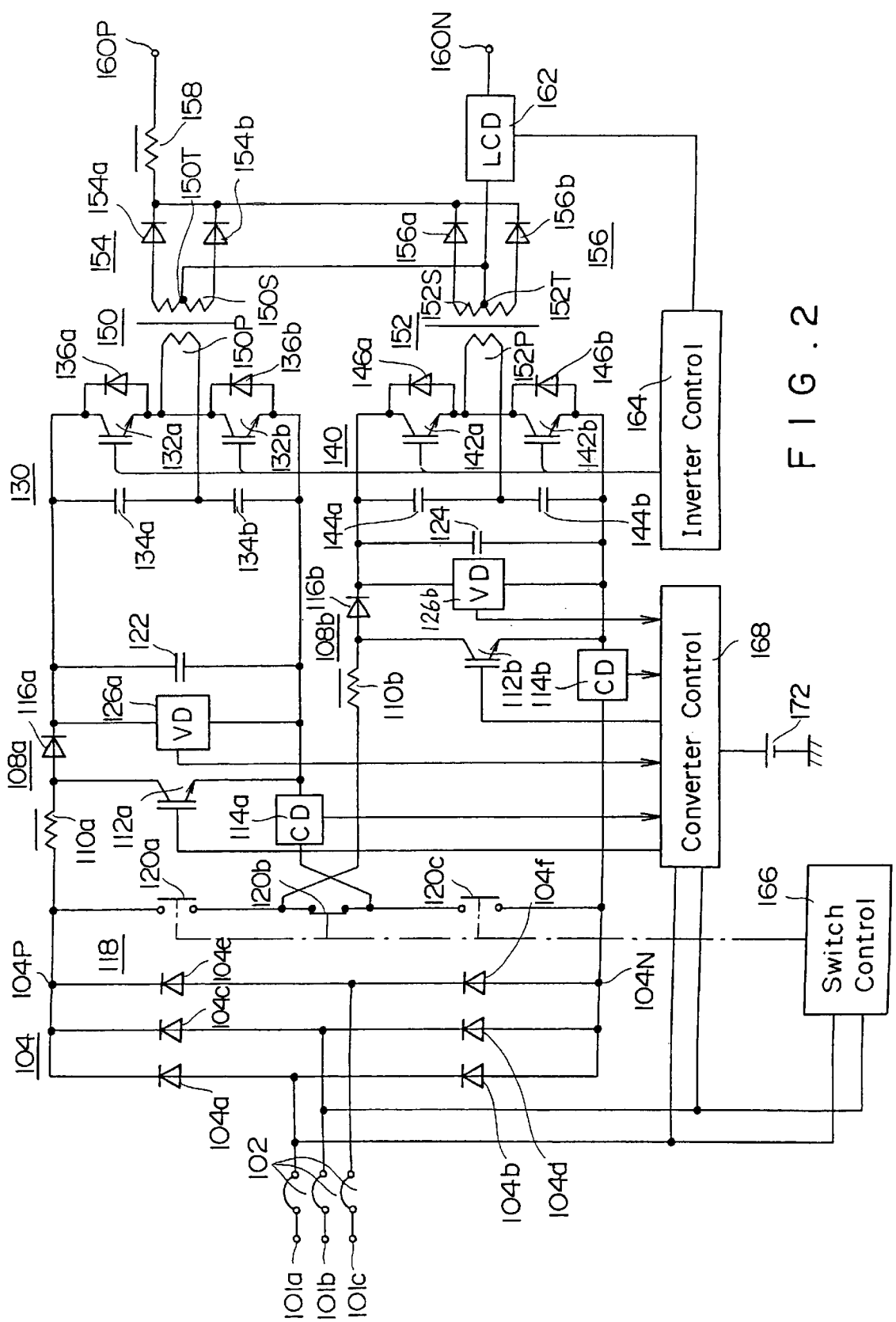
F I G . 2

POWER SUPPLY APPARATUS FOR ARC-UTILIZING APPARATUS

This invention relate to a power supply apparatus for arc-utilizing apparatuses, such as DC arc welders, DC arc cutters and discharge lamp ignition devices, and, more particularly, to such apparatus that can operate from any one of plural different-valued AC voltage sources.

BACKGROUND OF THE INVENTION

A power supply apparatus for an arc-utilizing apparatus sometimes needs to be used with either a high-voltage commercial AC power supply supplying a voltage of the order of, for example, 400 V or a low-voltage commercial AC power supply supplying a voltage of the order of, for example, 200 V.

There are plurality of low-voltage commercial AC power supplies, which provide an output voltage of, for example, 200 V, 208 V, 230 V and 240 V. Also, there are plural high-voltage commercial AC power supplies, which provide an output voltage of, for example, 380 V, 400 V, 415 V, 440 V and 460 V. Regions where high-voltage commercial AC power supplies are used and regions where lower-voltage commercial AC power supplies are used mingle in some area. In such area, a user must be very careful to determine an appropriate power supply apparatus.

Power supply apparatus manufacturers, too, must manufacture both high-voltage power supply apparatuses and low-voltage power supply apparatuses and store them. Sales agencies, too, must stock power supply apparatuses of both types. This is a burden on both manufacturers and sales agencies in view of manufacturing cost and stocking space.

A power supply apparatus which can operate from either of high-voltage and low-voltage power supplies has been long desired. One example of such power supply apparatuses is disclosed in Japanese (Unexamined) Patent Application Publication No. HEI 11-77302 (A) laid open for public inspection on Mar. 23, 1999. A circuit similar to this prior art apparatus is shown in FIG. 1. A commercial AC supply voltage applied to input supply terminals $1a$, $1b$ and $1c$ is coupled through a switch device 2 to an input-side rectifier 4 for rectification. The rectified voltage from the input-side rectifier 4 is raised in a voltage-boosting converter 8, which includes a reactor 10, an IGBT 12, a current detector 14 and a reverse-current blocking diode 16. The boosted voltage is developed between output terminals P and N of the voltage-boosting converter 8.

A switching unit 18 which may include a normally-open switch $20a$, a normally-closed switch $20b$ and a normally-open switch $20c$, is connected between the output terminals P and N. By properly opening and closing these switches $20a$–$20c$, smoothing capacitors 22 and 24 are connected in series or in parallel between the output terminals P and N.

Inverters 30 and 40 are connected across the smoothing capacitors 22 and 24, respectively. The inverter 30 is a half-bridge type inverter formed of IGBTs $32a$ and $32b$, capacitors $34a$ and $34b$, and flywheel diodes $36a$ and $36b$. Similarly, the inverter 40 is a half-bridge type inverter formed of IGBTs $42a$ and $42b$, capacitors $44a$ and $44b$, and flywheel diodes $46a$ and $46b$. The inverters 30 and 40 develop high-frequency voltages as their output voltages, which are applied to voltage-transformers 50 and 52, respectively.

The transformed voltages are applied to output-side rectifiers 54 and 56, respectively, formed of diodes $54a$ and $54b$ and diodes $56a$ and $56b$, respectively, where they are rectified. The rectified voltages are combined and smoothed in a smoothing reactor 58 before appearing between output terminals 60P and 60N of the power supply apparatus. The voltage developed between the output terminals 60P and 60N is applied to a load.

A current flowing through the load is detected by a current detector (CD) 62, and a controller 64 controls the conduction periods of the IGBTs $32a$, $32b$, $42a$ and $42b$ in accordance with a current-representative signal representing the detected load current, to thereby maintain the load current constant.

A switching control unit 66 controls the switching unit 18. The switching control unit 66 detects the voltage between the input terminals $1a$ and $1b$ and opens the normally-open switches $20a$ and $20c$, while closing the normally-closed switch $20b$, when it detects a high-voltage commercial AC supply being connected to the input of the apparatus. This causes the capacitors 22 and 24 to be connected in series between the terminals P and N. If the power supply connected to the input of the apparatus is a low-voltage commercial AC power supply, the switching control unit 66 closes the normally-open switches $20a$ and $20c$ and opens the normally-closed switch $20b$, which makes the capacitors 22 and 24 connected in parallel between the terminal P and N.

The voltage boosting converter 8 is controlled by a converter control unit 68. A reference signal source $70a$ to be used in association with higher commercial AC voltages is connected to the converter control unit 68 through a normally-closed switch $20e$, and a reference signal source $70b$ to be used in association with lower commercial AC voltages is connected to the converter control unit 68 through a normally-open switch $20d$. The switches $20e$ and $20d$ are also controlled by the switching control unit 66.

The voltage appearing between the output terminal P and N is detected by a voltage detector 26, which develops a voltage-representative signal representing the detected voltage. The voltage-representative signal is applied to the converter control unit 68.

When one of the high-voltage commercial AC power supplies is connected to the input terminals $1a$–$1c$, the switching control unit 66 causes the normally-closed switch $20e$ and the normally-open switch $20d$ to be maintained closed and open, respectively. Then, the converter control unit 68 controls the voltage-boosting converter 8 in accordance with the voltage-representative signal from the voltage detector 26 and a reference signal provided by the reference signal source $70a$, in such a manner that a voltage of about 640 V, which is equal to $\sqrt{2}\times460$ V, can be developed between the output terminals P and N. The voltage of 460 V is the highest one of the high-voltage power supply voltages. Since the normally-open switches $20a$ and $20c$ are open, while the normally-closed switch $20b$ is closed when the high voltage is applied to the apparatus, the capacitors 22 and 24 are connected in series, and, therefore, the voltage applied to each of the inverters 30 and 40 is about 320 V.

The converter control unit 68 controls the voltage-boosting converter 8 in accordance with the current-representative signal from the current detector 14, too, in order to improve the power factor.

When one of the low-voltage commercial AC power supplies is connected to the input terminals $1a$–$1c$, the switching control unit 66 opens the normally-closed switch $20e$ and closes the normally-open switch $20d$. Then, the converter control unit 68 controls the voltage-boosting converter 8, in accordance with the voltage-representative signal from the voltage detector 26 and the reference signal from the reference signal source 70*b*, in such a manner that a voltage of about 320 V can be developed between the output terminals P and N. Since the normally-open switches 20*a* and 20*c* are closed with the normally-closed switch 20*b* opened, the capacitors 22 and 24 are connected in parallel with each other, so that the voltage applied to each of the inverters 30 and 40 is about 320 V. In this case, too, the power factor is improved by the voltage-boosting converter 8.

As described above, whether a high-voltage commercial AC power supply or a low-voltage commercial AC power supply is connected to the input terminals 1*a*–1*c*, the voltage applied to each of the inverters 30 and 40 is about 320 V. Accordingly, as the IGBTs 32*a*, 32*b*, 42*a* and 42*b* of the inverters 30 and 40, general-purpose IGBTs withstanding a collector-emitter voltage of, for example, about 600 V can be used.

However, since the IGBT 12 of the voltage-boosting converter 8 may receive a voltage of as high as 640 V, an IGBT having an emitter-collector withstand voltage of 1200 V or higher must be used. Also, the single voltage-boosting converter 8 is used to supply current to the two inverters 30 and 40, a large current will flow through the IGBT 12 when it is turned on and off. Therefore, the IGBT 12 must a large capacity IGBT. Accordingly, a general-purpose IGBT as used in the inverters 30 and 40 cannot be used as the IGBT 12.

An object of the present invention is to provide a power supply apparatus with a voltage-boosting converter which uses a general-purpose semiconductor switching device.

SUMMARY OF THE INVENTION

According to the present invention, a power supply apparatus adapted for use with an arc-utilizing apparatus has input terminals adapted to be connection to one of commercial AC power supplies in first and second groups. Each of the first and second groups of commercial AC power supplies includes a plurality of power supplies providing output voltages of different magnitudes. The magnitudes of the output voltages of the first group of commercial AC power supplies are about two times as large as the output voltages of the second group commercial AC power supplies.

A rectifier rectifies a commercial AC voltage applied to the input terminals and develops a rectified voltage between two rectifier output terminals. A switching unit connects two voltage-boosting converters between the two rectifier output terminals either in series or in parallel with each other. A DC-to-high-frequency converter is connected in the output of each of the voltage-boosting converters, for converting a voltage applied to it into a high-frequency voltage.

The high-frequency voltage from each of the DC-to-high-frequency converters is applied to a primary side of a transformer. A high-frequency voltage induced in a secondary side of the transformer is converted to a DC voltage in a high-frequency-to-DC converter, and the resulting DC voltage is developed between two load output terminals.

When the commercial AC power supply connected to the input terminals is one of the first group, a switching control unit controls the switching unit so as to connect the voltage-boosting converters in series between the rectifier output terminals. If the commercial AC power supply connected to the input terminals belongs to the second group, the switching control unit controls the switching unit so as to connect the voltage-boosting converters in parallel between the rectifier output terminals.

With the above-described arrangement, regardless whether the voltage-boosting converters are connected in series or in parallel, the highest voltage applied to each voltage-boosting converter is about a half of the highest one of the voltages provided by the commercial AC power supplies of the first group. Accordingly, the semiconductor switching device of each voltage-boosting converter is required to withstand a lower voltage than prior art apparatuses.

Control means controls the two voltage-boosting converters so as to provide substantially equal DC voltages to the associated DC-to-high-frequency converters regardless whether the commercial AC power supply connected to the input terminals of the apparatus is of the first group or of the second group.

Accordingly, if the DC-to-high-frequency converters include semiconductor switching devices, it is sufficient for the semiconductor switching devices to withstand the DC voltages supplied from the associated voltage-boosting converters.

The control means may control the respective voltage-boosting converters in such a manner that they supply to the associated DC-to-high-of-frequency converters, about a half of the voltage resulting from rectifying the highest one of the voltages supplied by the commercial AC power supplies of the first group.

With the above-described arrangement, the semiconductor switching devices of the voltage-boosting converters need to withstand only the voltage of one half of the highest one of the commercial AC voltages which can be supplied by the first group of commercial AC power supplies. Thus, there is no need for using specially designed semiconductor switching devices withstand high voltages, but general-purpose ones can be used.

BRIEF DESCRIPTION OF THE DRAWINGS

FIG. 2 is a circuit diagram of a power supply apparatus adapted for use with an arc-utilizing apparatus, according to one embodiment of the present invention.

DESCRIPTION OF PREFERRED EMBODIMENT

Figure 1:
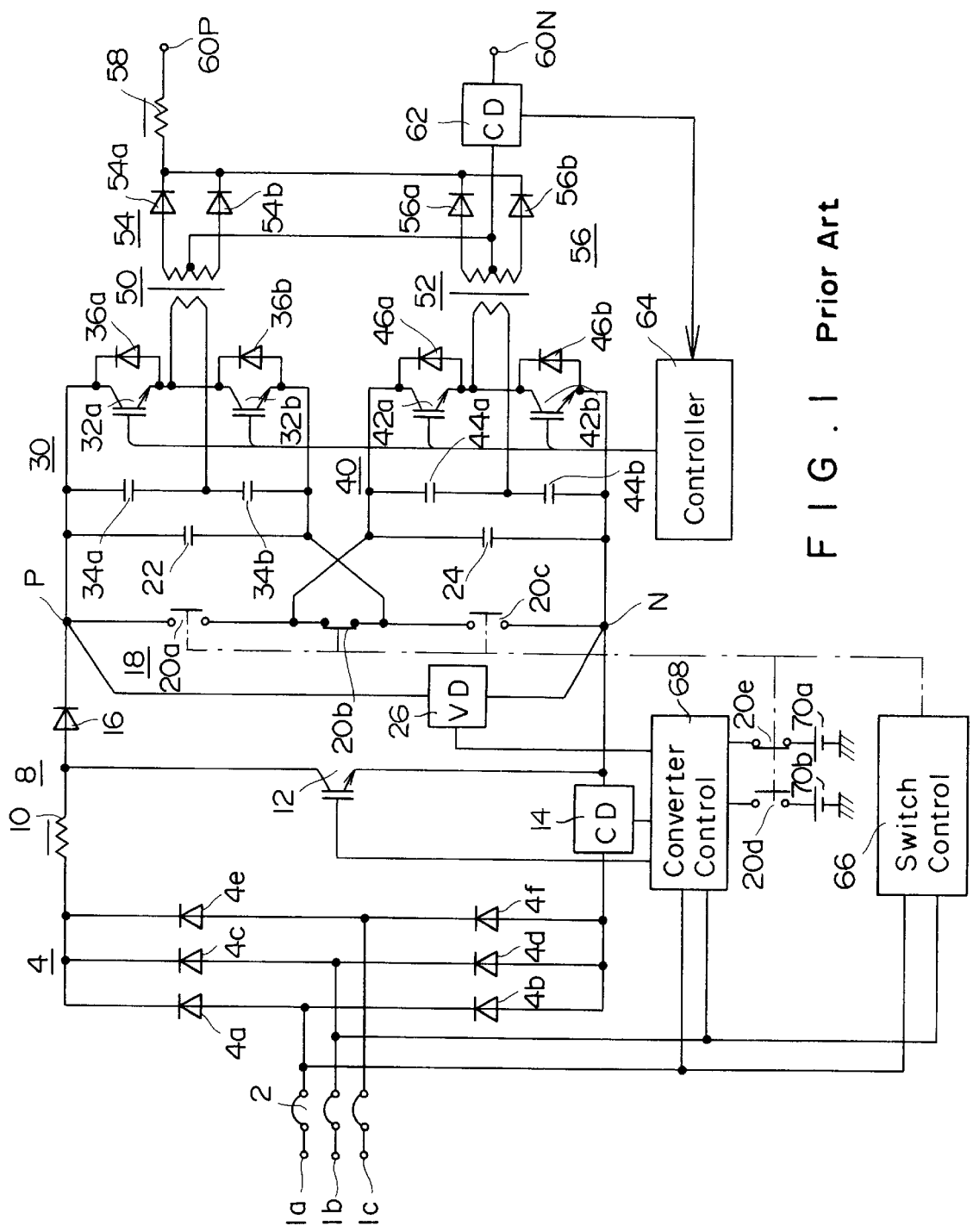
FIG. 1 is a circuit diagram of a prior-art power supply apparatus adapted for use with an arc-utilizing apparatus.

A power supply apparatus according to one embodiment of the present invention may be used with, for example, an arc welder. As shown in FIG. 2, the power supply apparatus has power supply input terminals 101*a*, 101*b* and 101*c*, which are adapted for connection to one of commercial AC power supplies belonging to first and second groups. The first group of commercial AC power supplies consists of a plurality of commercial three-phase AC power supplies which supply, for example, output voltages of 380 V, 400 V, 415 V, 440 V and 460 V, respectively. The second group consists of a plurality of commercial three-phase AC power supplies which supply, for example, output voltages of 200 V, 208 V, 230 V and 240 V, respectively. In general, the magnitudes of the output voltages provided by the first group AC power supplies is about two times the magnitudes of the output voltages provided by the second group AC power supplies.

The commercial AC voltage applied to the input terminals 101*a*–101*c* is coupled through an input switching device 102 to an input-side rectifier 104 and rectified. The rectifier 104 includes, for example, six rectifying diodes 104a, 104b, 104c, 104d, 104e and 104f which are connected in a bridge configuration. The output voltage from the rectifier 104 is developed between two rectifier output terminals 104P and 104N.

A switching unit 118 is connected between the rectifier output terminals 104P and 104N. The switching unit 118 has a series combination of a normally-open switch 120a, a normally-closed switch 120b and a normally-open switch 120c, with the normally-open switch 120a connected to the rectifier output terminal 104P and with the normally-open switch 120c connected to the rectifier output terminal 104N.

A voltage-boosting converter 108a is connected between the junction of the normally-closed switch 120b and the normally-open switch 120c, and the rectifier output terminal 104P. Similarly, a voltage-boosting converter 108b is connected between the junction of the normally-closed switch 120b and the normally-open switch 120a, and the rectifier output terminal 104N. In the state shown in FIG. 2 where the normally-open switches 120a and 120c are opened and the normally-closed switch 120b is closed, the voltage-boosting converters 108a and 108b are connected in series between the rectifier output terminals 104P and 104N. When the normally-open switches 120a and 120c are closed with the normally-closed switch 120b opened, the voltage-boosting converters 108a and 108b are connected in parallel between the rectifier output terminals 104P and 104N. The opening and closing of the switches 120a, 120b and 120c are done through a switching control unit 166.

The voltage-boosting converter 108a has a reactor 110a having first and second ends, with the first end connected to the rectifier output terminal 104P. The conduction path of a semiconductor switching device, e.g. the emitter-collector conduction path of an IGBT 112a, is connected between the second end of the reactor 110a and the junction of the normally-closed switch 120b and the normally-open switch 120c. Also connected to the second end of the reactor 110a is the anode of a reverse-current blocking diode 116a having its cathode connected to one end of a smoothing capacitor 122. The other end of the smoothing capacitor 122 is connected to the junction of the normally-closed switch 120b and the normally-open switch 120c.

The voltage-boosting converter 108b has a reactor 110b which has its first end connected to the junction of the normally-open switch 120a and the normally-closed switch 120b. The conduction path of a semiconductor switching device, e.g. the emitter-collector conduction path of an IGBT 112b, is connected between the second end of the reactor 110b and the rectifier output terminal 104N. Also connected to the second end of the reactor 110b is the anode of a reverse-current blocking diode 116b having its cathode connected to one end of a smoothing capacitor 124. The other end of the smoothing capacitor 124 is connected to the rectifier output terminal 104N.

A voltage detector (VD) 126a is connected across the capacitor 122 of the voltage-boosting converter 108a for detecting the voltage across the capacitor 122. The voltage detector 126a develops a voltage-representative signal representing the voltage across the capacitor 122. Similarly, a voltage detector (VD) 126b is connected across the capacitor 124 of the voltage-boosting converter 108b for detecting the voltage across the capacitor 124. The voltage detector 126b develops a voltage-representative signal represented the voltage across the capacitor 124. The voltage-representative signals from the voltage detectors 126a and 126b are coupled to a voltage-boosting-converter control unit 168.

A current detector (CD) 114a is connected between the junction of the normally-closed switch 120b and the normally-open switch 120c and the emitter of the IGBT 112a. The current detector 114a detects the current flowing through the voltage-boosting converter 108a and develops a current-representative signal representing the detected current. Similarly, a current detector (CD) 114b is connected between the rectifier output terminal 104N and the emitter of the IGBT 112b. The current detector 114b detects the current flowing through the voltage-boosting converter 108b and develops a current-representative signal representing the detected current. The current-representative signals from the current detectors 114a and 114b are also coupled to the voltage-boosting-converter control unit 168.

The voltage-boosting converter control unit 168 supplies the control electrodes, e.g. gates, of the IGBTs 112a and 112b with control signals for controlling the conduction periods of the IGBTs 112a and 112b in accordance with the voltage-representative signals and a reference signal provided by a reference signal source 172 so as to make the voltages across the capacitors 122 and 124 become equal to a voltage of, for example, about 320 V, the reference signal represents.

The conduction periods of the IGBTs 112a and 112b are also controlled by the voltage-boosting converter control unit 168 based on the current-representative signals and the voltage-representative signals for reducing the phase difference between the current flowing through the voltage-boosting converter 108a and the voltage across the capacitor 122 and reducing the phase difference between the current flowing through the voltage-boosting converter 108b and the voltage across the capacitor 124.

The voltage across the capacitor 122 is applied to a DC-to-high-frequency converter, e.g. an inverter 130. The inverter 130 may be a half-bridge type inverter and includes serially connected capacitors 134a and 134b. The series combination of the capacitors 134a and 134b is connected in parallel with the capacitor 122. The inverter 130 includes also semiconductor switching devices, e.g. IGBTs 132a and 132b, of which the conduction paths, e.g. the emitter-collector conduction paths, are connected in series with each other. The series combination of the emitter-collector conduction paths of the IGBTs 132a and 132b is connected in parallel with the series combination of the capacitors 134a and 134b. Flywheel diodes 136a and 136b are connected in an anti-parallel configuration with the emitter-collector conduction paths of the IGBTs 132a and 132b, respectively. The junction of the emitter of the IGBT 132a and the collector of the IGBT 132b and the junction of the capacitors 134a and 134b, which provide output terminals of the inverter 130, are connected to opposite ends of a primary winding 150P of a transformer 150.

The inverter 140 is of a half-bridge type, too, and includes a series combination of capacitors 144a and 144b, which is connected in parallel with the capacitor 124. The inverter 140 includes also a series combination of conduction paths of semiconductor switching devices, e.g. a series combination of the emitter-collector conduction paths of IGBTs 142a and 142b. The serial combination of the emitter-collector paths is connected in parallel with the series combination of the capacitors 144a and 144b. Diodes 146a and 146b are connected in an anti-parallel configuration with the emitter-collector conduction paths of the IGBTs 142a and 142b, respectively. The junction of the emitter of the IGBT 142a and the collector of the IGBT 142b and the junction of the capacitors 144a and 144b, which provide output terminals of the inverter 140, are connected to opposite ends of a primary winding 152P of a transformer 152.

High-frequency-to-DC converters, for example, output-side rectifiers 154 and 156 are connected across secondary windings 150S and 152S of the transformers 150 and 152, respectively. The output-side rectifier 154 includes rectifying diodes 154a and 154b having their anodes connected to respective ends of the secondary winding 150S, and the output-side rectifier 156 includes rectifying diodes 156a and 156b having their anodes connected to respective ends of the secondary winding 152S. The cathodes of the diodes 154a, 154b, 156a and 156b are connected together to a load output terminal 160P through a smoothing reactor 158. A load output terminal 160N of the power supply apparatus is connected to intermediate taps 150T and 152T provided on the secondary windings 150S and 152S of the transformers 150 and 152. The load output terminals 160P and 160N are adapted to be connected to a load, for example, an arc welder (not shown).

A load current detector 162 is connected between the junction of the intermediate taps 150T and 152T and the load output terminal 160N. The load current detector (LCD) 162 detects the current flowing through the load and develops a load-current representative signal representing the magnitude of the detector load current. The load-current representative signal is applied to an inverter control unit 164. The inverter control unit 164 is responsive to the load-current representative signal for applying control signals to control electrodes, e.g. gates, of the IGBTs 132a, 132b, 142a and 142b, for thereby controlling the conduction periods of the IGBTs 132a, 132b, 142a and 142b in such a manner that the current flowing through the load can have a predetermined value.

Figure 3:
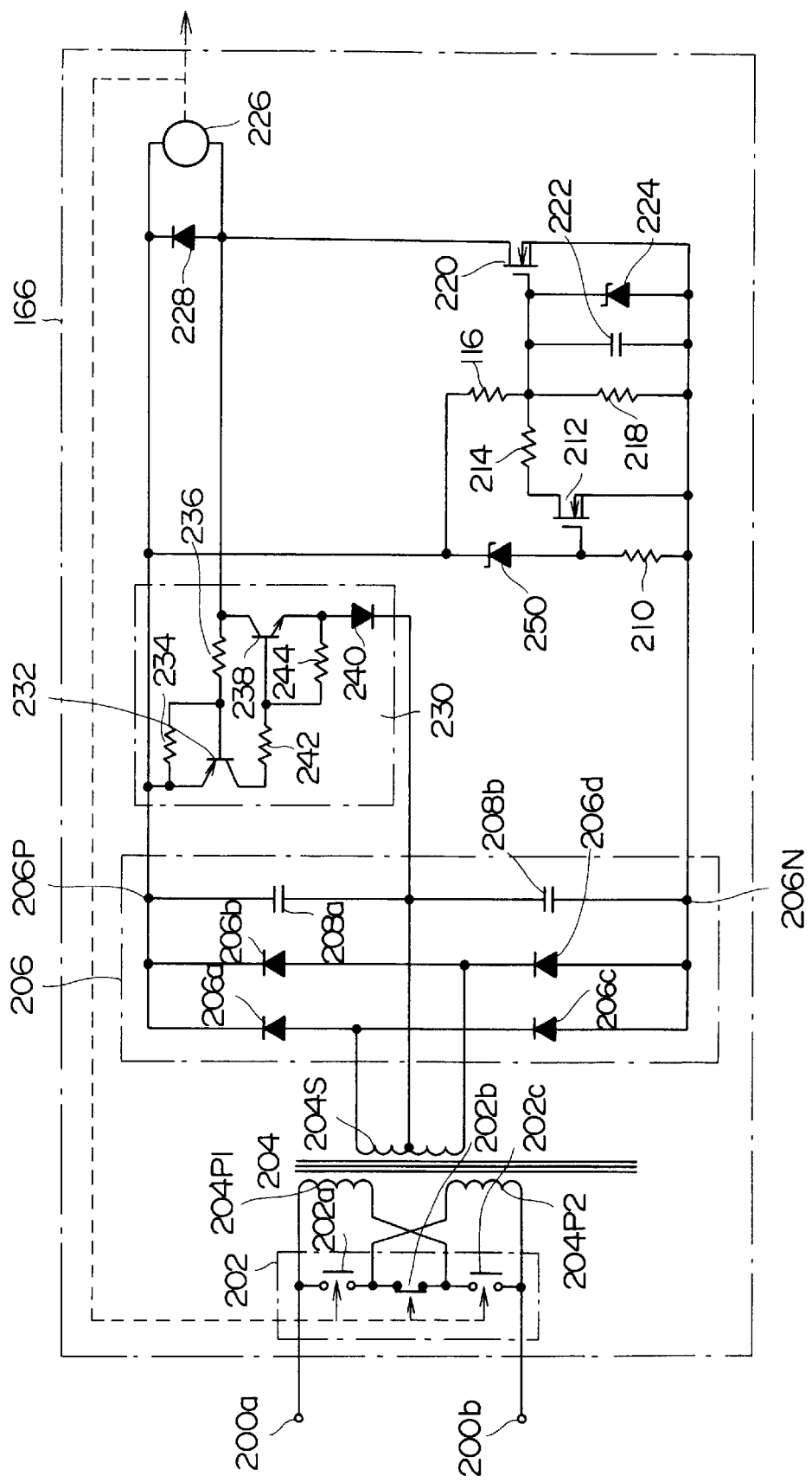
FIG. 3 is a circuit diagram of a switching control unit for the power supply apparatus shown in FIG. 2.

As shown in FIG. 3, the switching control unit 166 has input terminals 200a and 200b, which are connected through the input switching device 102 to the power supply terminals 101a and 101b (FIG. 2), respectively. A switching unit 202 is connected between the input terminals 200a and 200b. The switching unit 202 includes a combination of a normally-open switch 202a, a normally-closed switch 202b and a normally-open switch 202c connected in series in the named order with the switch 202a connected to the input terminal 200a.

The input terminal 200a is connected to one end of a primary winding 204P1 of a transformer 204, which also has another primary winding 204P2. The other end of the primary winding 204P1 is connected to the junction of the normally-closed switch 202b and the normally-open switch 202c. One end of the other primary winding 204P2 is connected to the junction of the normally-closed switch 202b and the normally-open switch 202a, with the other end connected to the input terminal 200b.

When the normally-open switches 202a and 202c are open, with the normally-closed switch 202b closed, the primary windings 204P1 and 204P2 are connected in series. On the other hand, if the normally-open switches 202a and 202c are closed, with the normally-closed switch 202b opened, the primary windings 204P1 and 204P2 are connected in parallel with each other.

The transformer 204 has a secondary winding 204S across which a DC converter 206 is connected. The DC converter 206 has four rectifying diodes 206a, 206b, 206c and 206d which are connected in a bridge configuration, and rectifies a single-phase AC voltage induced across the secondary winding 204S. The rectified voltage is developed between two output terminals 206P and 206N. A series combination of smoothing capacitors 208a and 208b is connected between the output terminals 206P and 206N for smoothing the rectified voltage.

A series combination of a zener diode 250 and a resistor 210 is connected between the output terminals 206P and 206N, with the cathode of the zener diode 250 connected to the output terminal 206P and with the anode connected to the resistor 210. The zener diode 250 and the resistor 210 have their values selected such that the zener diode 250 is rendered conductive when one of the high output voltages of the first group of commercial AC power supplies is applied between the input terminals 200a and 200b.

The junction of the anode of the zener diode 250 and the resistor 210 is connected to a control electrode of a semiconductor switching device, for example, the gate of a FET 212, of which the drain is connected to the output terminal 206P through a series combination of resistors 214 and 216. The source of the FET 212 is connected to the output terminal 206N. A resistor 218 is connected between the junction of the resistors 214 and 216 and the output terminal 206N, and the junction of the resistors 216 and 218 is connected to a control electrode of a semiconductor switching device, e.g. the gate of a FET 220. A capacitor 222 and a zener diode 224 are connected in parallel with the resistor 218. A conduction path, e.g. the drain-source conduction path of the FET 220 is connected in series with a relay driving coil 226 between the output terminals 206P and 206N.

When current flows through it, the relay driving coil 226 causes the normally-open switches 202a and 202c to be closed and causes the normally-closed switch 202b to be opened. At the same time, the relay driving coil 226 causes the normally-open switches 120a and 120c (FIG. 2) to be closed and causes the normally-closed switch 120b (FIG. 2) to be opened.

A protection diode 228 is connected in parallel with the relay driving coil 226.

A self-holding circuit 230 including a PNP transistor 232 is provided. That end of the relay driving coil 226 which is connected to the cathode of the protection diode 228 is connected to the emitter of the PNP transistor 232. The emitter of the PNP transistor 232 is also connected through a resistor 234 to its own base, which is connected through resistor 236 to that end of the relay driving coil 226 to which the anode of the protection diode 228 is connected. The anode of the protection diode 228 is also connected to the collector of an NPN transistor 238 which has its emitter connected through a diode 240 to the intermediate tap 204T on the secondary winding 204S of the transformer 204. The base of the transistor 238 is connected through a resistor 242 to the collector of the PNP transistor 232 and also to the emitter of the transistor 238 through a resistor 244.

Referring to FIGS. 2 and 3, let it be assumed that a high-voltage power supply, for example, a commercial AC power supply which supplies the highest voltage, 460 V, is connected to the input power supply terminals 101a–101c of the power supply apparatus with the above-described arrangement. At the instant the power supply is connected, no current is flowing through the relay driving coil 226, and, therefore, the normally-open switches 202a and 202c are open, while the normally-closed switch 202b is closed. Then, the primary windings 204P1 and 204P2 are in series with each other, and, therefore, a voltage of 460 V is applied across the series combination of the primary windings 204P1 and 204P2. An AC voltage is induced in the secondary winding 204S and is converted into a DC voltage in the DC converter 206. The DC voltage is applied across the series combination of the zener diode 250 and the resistor 210, which renders the zener diode 250 to become conductive. This, in turn, renders the FET 212 to be conductive, and, therefore, the gate of the FET 220 is grounded through the resistor 214 and the FET 212. Accordingly, the FET 220 becomes non-conductive. As a result, no current flows through the relay driving coil 226, which maintains the normally-open switches 202a and 202c open and the normally-closed switch 202b closed.

At the same time, the normally-open switches 120a and 120c of the switching unit 118 which is also controlled by the relay driving coil 226 are kept open, while the normally-closed switch 120b is kept closed. As a result, the voltage-boosting converters 108a and 108b are connected in series between the rectifier output terminals 104P and 104N, and a voltage equal to 460 V×√2 (equaling to about 640 V) is applied to the serially connected voltage-boosting converters 108a and 108b. As a result, the magnitude of the voltage apportioned to each of the transistors 112a and 112b of the voltage-boosting converters 108a and 108b is about 320 V. With this voltage applied, the voltage-boosting converters 108a and 108b do not boost the applied voltage, and the voltage of about 320 V is applied to each of the inverters 130 and 140.

When any other one of the high-voltage power supplies of the first group is connected to the power supply input terminals 101a–101c, the voltage-boosting converters 108a and 108b are connected in series, too, and a voltage lower than 320 V is applied to the converters 108a and 108b. Each of the voltage-boosting converters 108a and 108b boosts the voltage applied to it to about 320 V and applies the boosted voltage of about 320 V to the associated inverter 130 or 140.

In this case, the power factors of the current flowing through the voltage-boosting converters are improved.

As described, the maximum of about 320 V is applied to the inverters 130 and 140 whichever one of the high commercial voltage providing power supplies of the first group is connected to the power supply input terminals 101a–101c.

The inverters 130 and 140 convert the voltages applied to them to high-frequency voltages and apply the resulting high-frequency voltage to the transformers 150 and 152, respectively. The high-frequency voltages are voltage-transformed in the transformers 150 and 152, and the transformed voltages are rectified in the output-side rectifiers 154 and 156, respectively. The rectified voltages are smoothed by the smoothing reactor 158, and the rectified and smoothed voltage is developed between the output terminals 160P and 160N for application to a load.

The current flowing through the load when the output voltage is applied to the load is detected by the load current detector (LCD) 162. The conduction periods of the IGBTs 132a and 132b of the inverter 130 and the conduction periods of the IGBTs 142a and 142b of the inverter 140 are controlled in such a manner that the current flowing through the load can have a predetermined value.

When one of the low-voltage commercial AC power supplies of the second group is coupled to the power supply input terminals 101a–101c, the low voltage is applied across the serially connected primary windings 204P1 and 204P2 of the transformer 204 (FIG. 3), which causes a voltage-transformed AC voltage to be induced in the secondary winding 204S. The induced AC voltage is converted into a DC voltage by the DC converter 206. The resultant DC voltage is applied across the series combination of the zener diode 250 and the resistor 210. The voltage across the zener diode 250 is below a predetermined voltage above which the zener diode 250 is rendered conductive, and, therefore, the zener diode 250 is non-conductive.

A voltage is developed across the resistor 218, and the FET 220 becomes conductive, which causes a current to flow through the relay driving coil 226. This, in turn, causes the normally-open switches 202a and 202c to be closed and causes the normally-closed switch 202b to be opened, which results in parallel connection of the primary windings 204P1 and 204P2 of the transformer 204. An increased voltage is induced in the secondary winding 204S of the transformer 204 when the primary windings 204P1 and 204P2 of the transformer 204 are connected in parallel.

The current flowing through the relay driving coil 226 renders the transistors 232 and 238 conductive and flows through the transistor 238 to the intermediate tap 204T on the secondary winding 204S. Accordingly, if the FET 220 is rendered non-conductive for any reason, current continues to flow through the relay driving coil 226 so that the relay driving coil 226 is kept latched in.

Because of the current flow through the relay driving coil 226, the normally-open switches 120a and 120c (FIG. 2) are closed, and the normally-closed switch 120b is opened. Accordingly, the voltage-boosting converters 108a and 108b are connected in parallel with each other between the rectifier output terminals 104P and 104N. Each of the voltage-boosting converters 108a and 108b connected in parallel raises the voltage applied to it up to about 320 V, and the boosted voltage is coupled to the associated inverter 130 or 140.

Therefore, whether the power supply connected to the power supply apparatus is of the low-voltage supplying commercial AC power supplies or of the high-voltage supply commercial AC power supplies, the magnitude of the voltage applied to the IGBTs 112a and 112b of the voltage-boosting converters 108a and 108b is only about 320 V. Accordingly, widely available general-purpose IGBTs having an emitter-collector withstand voltage of about 600 V can be used as the IGBTs 112a and 112b.

The high-frequency voltage produced by the inverters 130 and 140 are voltage-transformed in the transformers 150 and 152, respectively, and rectified in the output-side rectifiers 154 and 156. The rectified voltages are smoothed in the smoothing reactor 158, and the smoothed voltage is developed between the load output terminals 160P and 160N for application to a load. In this case, too, the current flowing through the load is detected by the load current detector 162, and the conduction periods of the IGBTs 132a, 132b, 142a and 142b of the inverters 130 and 140 are controlled in such a manner as to maintain the current flowing through the load constant.

As described above, according to the present invention, depending on whether the commercial AC power supply connected to the power supply input terminals 101a–101c of the power supply apparatus is one of the high-voltage or low-voltage supplying power supplies, the voltage-boosting converters 108a and 108b are connected in series or in parallel. Accordingly, the highest voltage applied to each of the IGBTs 112a and 112b used in the voltage-boosting converters 108a and 108b is only about 320 V. Therefore, the IGBTs 112a and 112b can be general-purpose IGBTs.

The power supply apparatus has been described as being connected to a three-phase commercial AC power supply, but it may be so arranged as to be used with a single-phase AC power supply. In stead of the switching control unit 166 shown in and described with reference to FIG. 3, the switching control unit may include a relay which operates when a voltage higher than a predetermined value is applied to it. The setting of the output voltages of the voltage-boosting converters 108a and 108b is done through the single reference signal source 172 for both of the high-voltage and low-voltage supplying commercial AC power supplies, and, therefore, the voltage applied to the inverters 130 and 140 can be equal. However, if the voltages applied to the inverters 130 and 140 can differ slightly, separate reference signal sources may be used for the respective voltage-boosting converters 108a and 108b.

Furthermore, instead of IGBTs, other semiconductor devices, such as FETs and bipolar transistors, may be used as the semiconductor switching devices of the inverters 130 and 140 and the voltage-boosting converters 108a and 108b.

Also, in place of the inverters, choppers or feed-forward circuits may be used as the DC-to-high-frequency converters.

What is claimed is:

1. A power supply apparatus for arc-utilizing apparatuses, comprising:
    a power supply terminal to which one of plural commercial AC power supplies providing different AC voltages is adapted to be connected, said plural commercial AC power supplies belonging to either first or second group, a magnitude of the AC voltages provided by the AC power supplies of said first group being about twice that of the AC voltages provided by the AC power supplies of said second group;
    a rectifier for rectifying the AC voltage provided by the commercial AC power supply connected to said power supply terminal and developing a rectified voltage between two rectifier output terminals;
    two voltage-boosting converters;
    a switching unit for selectively connecting said two voltage-boosting converters in series and in parallel with each other between said two rectifier output terminals;
    two DC-to-high-frequency converters connected in output sides of and in association with said respective voltage-boosting converters, for converting DC voltages inputted thereto from the associated ones of said voltage-boosting converters into high-frequency voltages;
    a voltage-transformer having a primary side receiving the high-frequency voltages from said DC-to-high-frequency converters;
    a high-frequency-to-DC converter for converting a high-frequency voltage induced in a secondary side of said voltage-transformer into a DC voltage, said DC voltage being developed between two load output terminals; and
    a switching control unit for controlling said switching unit in such a manner that said two voltage-boosting converters can be connected in series between said rectifier output terminals when the commercial AC power supply connected to said power supply terminal belongs to said first group, said switching control unit controlling said switching unit in such a manner that said two voltage-boosting converters can be connected in parallel between said rectifier output terminals when the commercial AC power supply connected to said power supply terminal belongs to said second group.

2. The power supply apparatus according to claim 1 wherein said two voltage-boosting converters are controlled by control means in such a manner as to provide the associated DC-to-high-frequency converters with substantially the same constant boosted voltages whether the commercial AC power supply connected to said power supply terminal belongs to said first group or said second group.

3. The power supply apparatus according to claim 1 wherein said voltage-boosting converters are controlled by control means in such a manner as to provide the associated DC-to-high-frequency converters with a voltage of about one half of a voltage resulting from rectifying the highest of the AC voltages available from said first group of commercial AC power supplies regardless of the commercial AC power supply connected to said power supply terminal.

* * * * *